United States Patent [19]

Clausen

[11] Patent Number: 4,663,812
[45] Date of Patent: May 12, 1987

[54] METHOD OF MANUFACTURE OF MANIFOLDS

[75] Inventor: Edvin L. Clausen, Tonder, Denmark

[73] Assignee: Norsk Hydro A.S., Oslo, Norway

[21] Appl. No.: 833,711

[22] Filed: Feb. 27, 1986

[51] Int. Cl.[4] .................. B21D 53/00; B21K 29/00; B23P 15/26

[52] U.S. Cl. ......................... 29/157.4; 29/157 T; 72/254; 72/264; 72/370; 165/173; 165/176

[58] Field of Search .......... 29/157.3 R, 157.4, 157 T; 165/176, 173; 72/370, 264, 254

[56] References Cited

U.S. PATENT DOCUMENTS

| 1,906,953 | 5/1933 | Enghauser | 29/157.4 X |
|---|---|---|---|
| 2,086,125 | 7/1937 | Ewing | 29/157.4 |
| 3,741,849 | 6/1973 | Hardy | 165/173 X |
| 4,246,772 | 1/1981 | Moshnin et al. | 73/370 X |
| 4,270,374 | 6/1981 | Kugler | 72/370 X |

FOREIGN PATENT DOCUMENTS

| 651101 | 10/1937 | Fed. Rep. of Germany | 29/157 T |
|---|---|---|---|
| 548189 | 9/1956 | Italy | 29/157 T |
| 197119 | 5/1923 | United Kingdom | 29/157 T |
| 2078361 | 1/1982 | United Kingdom | 165/176 |

Primary Examiner—Charlie T. Moon
Attorney, Agent, or Firm—Wenderoth, Lind & Ponack

[57] ABSTRACT

A method of manufacturing integrated manifolds for heat exchangers include providing hollow shape with a plurality of individual risers each having a substantially solid cross-section. Subsequently, the risers are reshaped by means of a reverse impact extrusion process into hollow risers. Finally, by perforating the wall of the hollow shape under the hollow risers, apertures are provided constituting inlets connecting the cavity of the hollow shape with the individual hollow risers.

3 Claims, 6 Drawing Figures

४,६६३,८१२

METHOD OF MANUFACTURE OF MANIFOLDS

FIELD OF THE INVENTION

The present invention concerns a method for manufacturing of manifolds, particularly a manifold for heat exchangers, comprising a hollow body having a plurality of hollow risers for connection to heat exchanger tubes.

BACKGROUND OF THE INVENTION

Connections between manifold/headerplate and tubes in heat exchangers applied as e.g. condensers or radiators in a vehicle, are in principle provided by two methods—soldering/brazing or mechaical expansion of the tubes after their insertion into the manifold or a header plate. All methods are at the present time characterized by several problems connected to the providing of a reliable, leakage-proof connection having satisfactory mechanical strength.

GB 1,492,555 describes a heat exchanger for vehicles based upon a mere expansion connection between the tubes and the manifold without use of supplementary rubber packing. The construction is characterized by a precisely specified interaction between a number of parameters such as wall thickness, tube diameter, material strength, length of support and others expressed in empirical formulas. This construction requires high tolerance from the components, and furthermore it has obvious limitations with regard to free choice of materials, wall thickness, tube diameter, etc.

A further disadvantage of the disclosed construction is represented by the process employed for making fastening apertures in the tube wall. The wall is "knocked down" and pressed and drawn further inwards to constitute a collar or flange which ensures the necessary support or backing area for fastening of the heat exchanger tubes. The height of the collar is related to the wall thickness of the manifold, which gives poor possibilities of achieving an adequate collar height on thin-walled manifolds due to the limited material mass which can be transferred in the deformation zone.

Limited material flow is also the disadvantage of the so-called T-drill or Flow-drill processes, where by means of special tools the manifold tube is perforated and a low collar is formed. Depending on the type of tool employed, this collar is formed on the outside or both on the innerside and on the outside of the manifold. In those cases where the collar protrudes inwards into the manifold the available, free cross-section of the manifold is reduced and an increased pressure drop in the heat exchanger arises due to turbulent currents in the manifold.

Additionally to the above mentioned disadvantages also several other problems arise by brazing of the heat exchanger tubes to such manifolds. Because of the short collar a penetration of brazing material and flux along the tubes into the manifold occurs quite frequently, which further contributes to the reduction of the available, free cross-section. Flux residues being entrapped in this way are difficult to remove and they have a corrosion promoting effect on the components. Furthermore, it is difficult to achieve a tight and rigid connection because of too short available brazing length. In the case of inwards protruding brazing hollow risers it is difficult to control the amount of heat since the joining zone is concealed in the manifold. Differences in wall thickness between the joined components represents another obstacle to achieving a proper control over heat balance in the joining process. Overheating of the tubes and mechanical weakening of the connection as a result of this, therefore represents an imminent danger of a high reject rate by manufacture of heat exchangers according to this principle.

Co-pending U.S. patent application Ser. NO. 793,285 discloses still another manifold construction and method of its manufacture. The construction is characterized by provision of a shaped tube with an outwardly, longitudinally running protrusion part which constitutes an integrated portion of fastening flanges for the heat exchanging tubes. The resulting manifolds overcome the above mentioned disadvantages, ensuring leakage-proof and rigid connection to the heat exchanger tubes. However, the disclosed manufacturing method and resulting manifold design does not offer a flexible solution with regard to current, alternative methods of joining manifolds to heat exchanger tubes. This manifold design, for example, allows only for insertion of tubes into the fastening flanges to that not all presently installed industrial assembling lines can be used for the subsequent brazing process.

There is still another known process of manifold manufacture where the hollow risers are provided by a step wise deep drawing operation performed on aluminum sheet material. The reworking steps in this process are bending of the sheet and welding of butted sheet ends in order to form a tube. A weakness of this construction is a longitudinally running welded seam which does not provide a reliable and tight rigid joint under high pressure in heat exchangers. The thickness of the applied sheet limits also in this case the achieved maximum length of the risers.

OBJECT OF INVENTION

The object of the present invention is to provide a new and improved manufacturing method providing integrated manifolds having a plurality of individual hollow risers for connection to heat exchanger tubes and where the tubes can be positioned both inside and outside of the hollow risers.

BRIEF DESCRIPTION OF THE DRAWINGS

The above and other objectives and advantages of the present manufacturing method will become apparent from the following description taken in connection with the accompanying drawings wherein.

DESCRIPTION OF THE PREFERRED EMBODIMENTS

Figure 1:
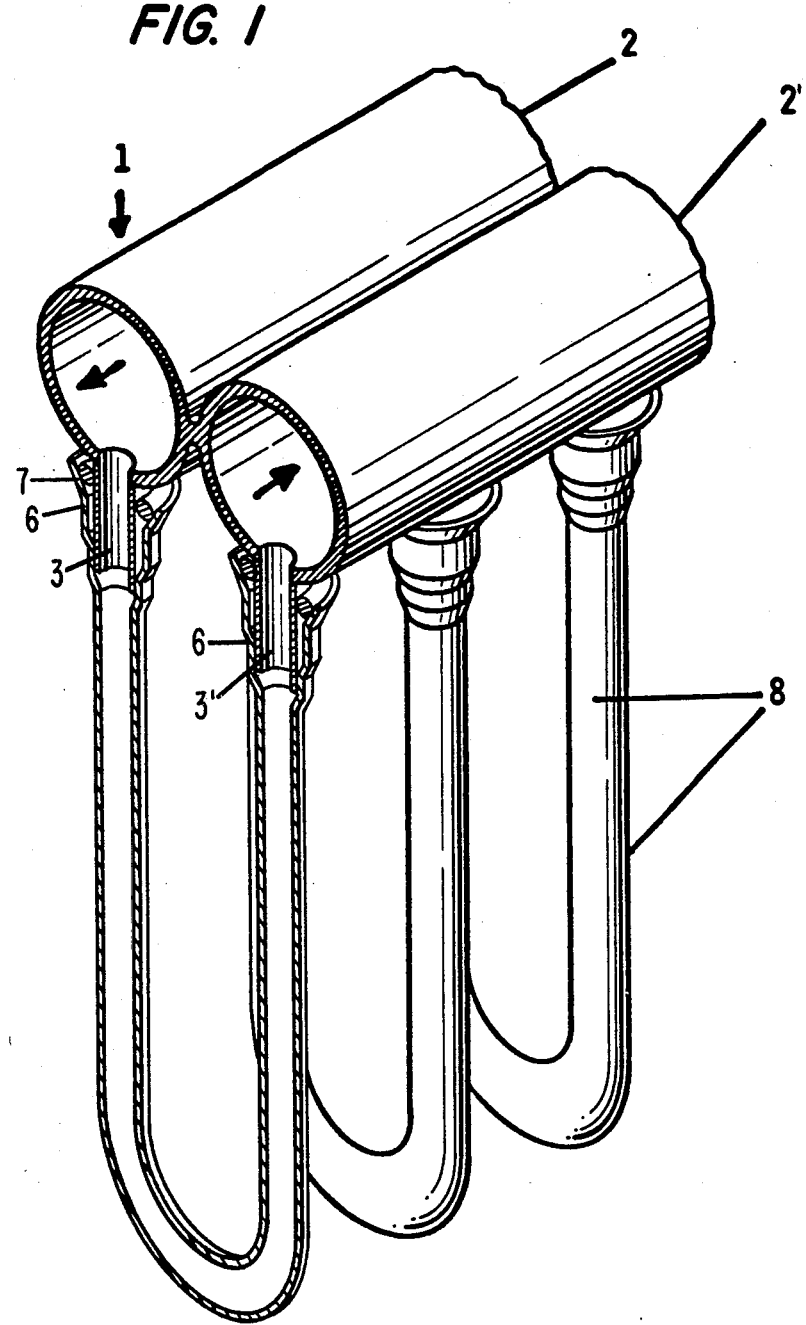
FIG. 1 is a fragmentary view partially in cross-section of a manifold and attached heat exchanger tubes (hairpins) formed according to the method of the present invention.

FIG. 1 shows in vertical cross-section a variant of the manifold manufactured according to the present invention. The manifold (1) is shown as two co-extruded, hollow shapes (2,2') constituting respectively inlet and outlet tubes for circulation of cooling medium in a heat exchanger, e.g. a condenser. Individual hollow risers (3,3') protruding from surfaces of the hollow shapes (2,2') constitute resting or supporting surfaces for caps (6) formed on the ends of so-called hairpin tubing (8), connecting the hollow shapes together and forming a circulation path in the heat exchanger. The tapered shape of the caps (6) facilitates insertion and positioning of the hairpin tubing (8) and provides an accomodation for brazing material (7).

Figure 2:
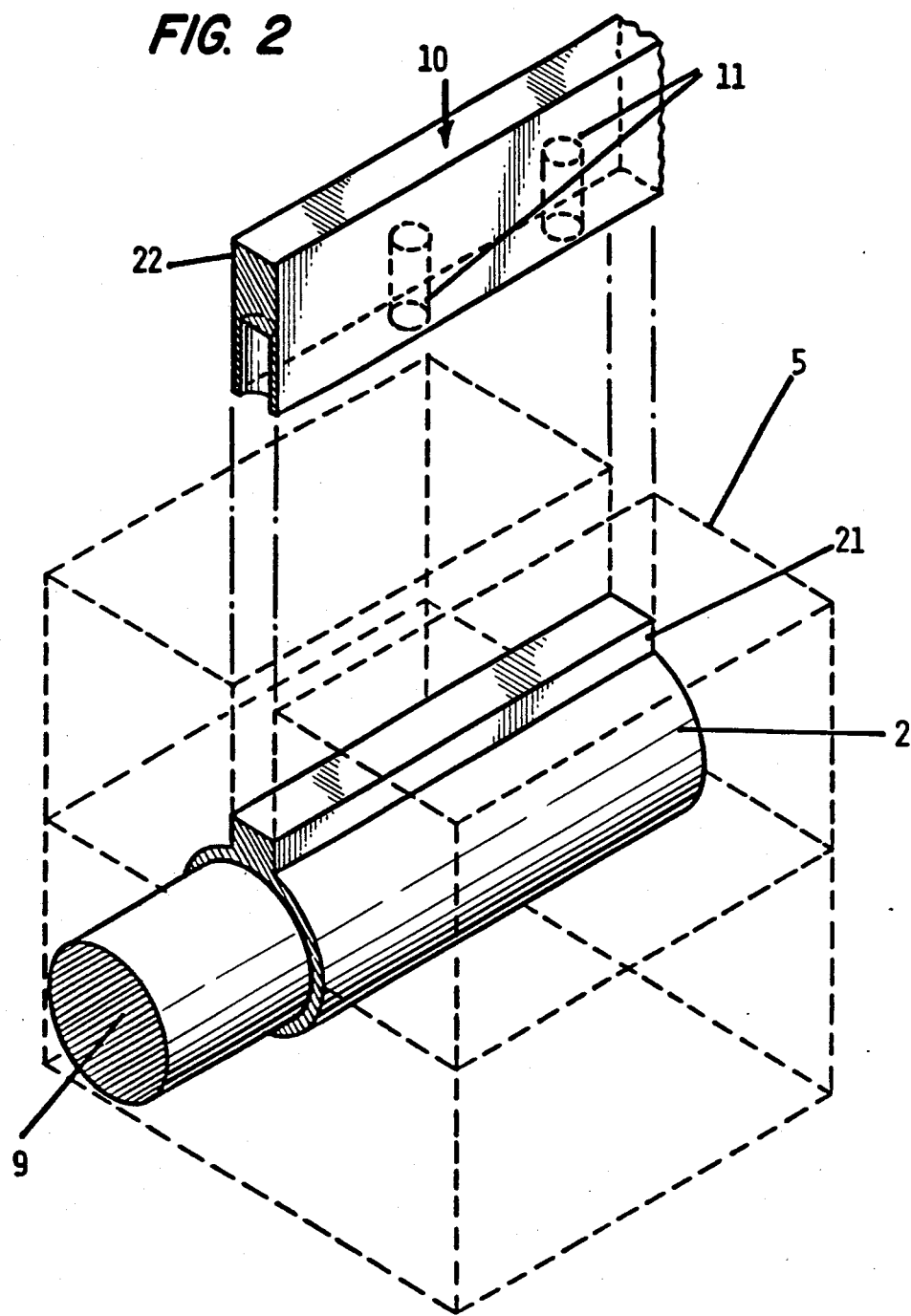
FIGS. 2–6 are schematic views illustrating the individual steps in the manufacturing process.

FIG. 2 illustrates schematically the first step in the manufacturing process. An extruded or possibly drawn hollow shape, shown as a single tube (2) provided with an integral, longitudinally running neck part (21) and having an inserted cylinder (9) complementary shaped and dimensioned to fit the tube's avoid, is fixed in a fixture device (5). The neck part (21) is then subjected to a cold forming process by means of a press tool (10). The press tool (10), shown schematically and partly in vertical cross-section as an extrusion member (22) comprising a plurality of cylindrical voids (11), is forced against the neck part (21) of the fixed tube (2). Exposed to such pressure the neck part is subjected to a deformation process resulting in material flow into the voids (11) in the extrusion member (22) and formation of individual, cylindrical solid risers.

Figure 3:
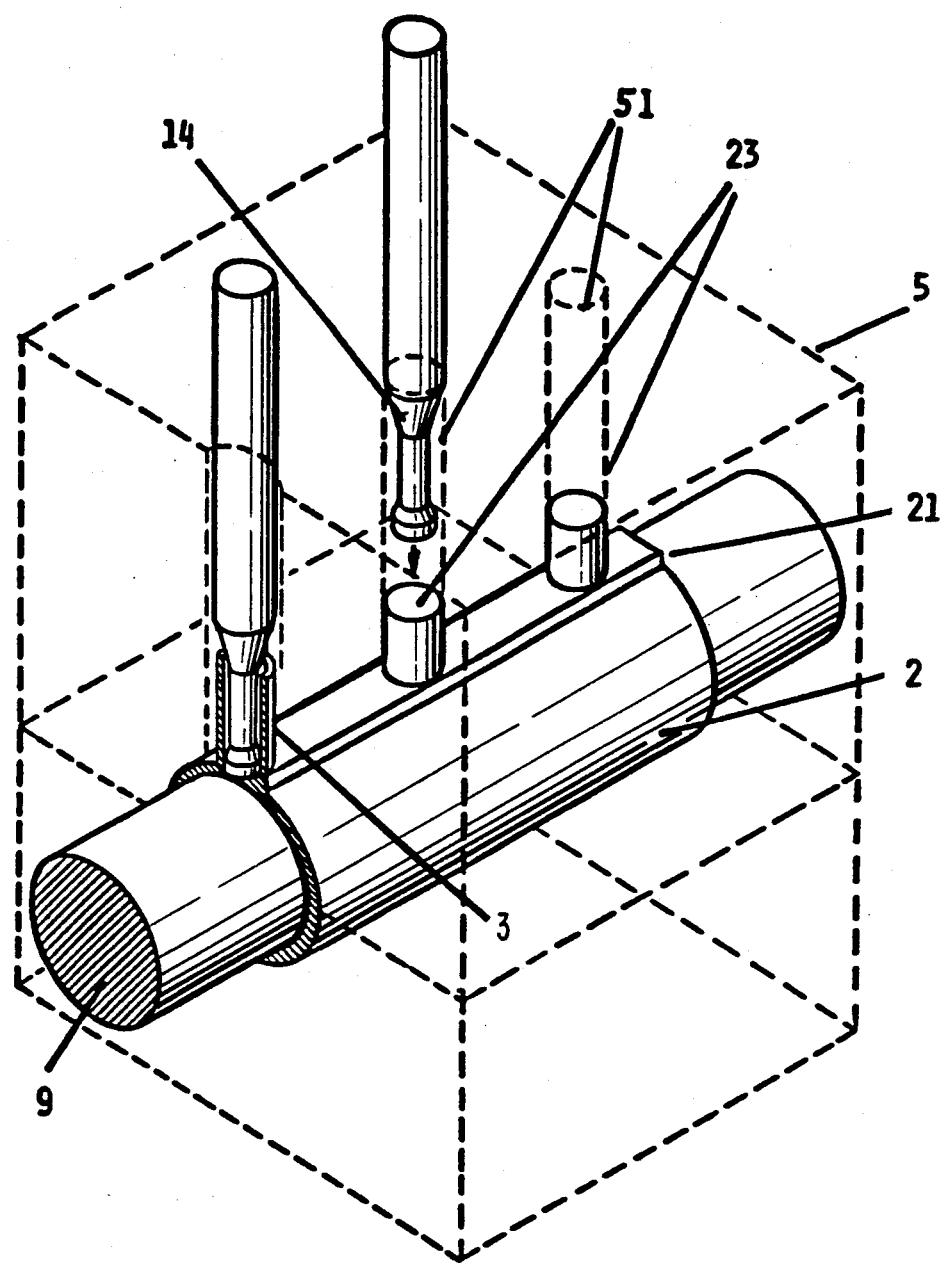

FIG. 3 shows the intermediate product (2) from the first step of the manufacturing process positioned in a new fixture arrangement (5) ready for a subsequent working step. The height of the neck part (21) is now substantially reduced and the achieved cylindrical solid risers (23) are subjected to reverse impact extrusion by means of a new set of extrusion tools comprising a housing mandrel (14). The impact extrusion may be conducted as a sequential operation done by one tool only, as shown for illustration purposes in the FIG. 3, or by one operation on all risers (23) using a set of tools. As appears from the drawing, shown in cross-section a final stage of the impact extrusion operation on one of the risers (23), the riser is converted into a thin-walled hollow riser (3) by penetration of the mandrel (14) into the riser and the resulting material flow between the mandrel and the walls of cylindrical voids (51) provided in the upper part of the fixture (5) for each riser (23).

By an appropriate dimensions of the original neck part (21) and the intermediate solid risers (23), the height and form of the final hollow risers (3) is determined and achieved by this single operation.

Figure 4:
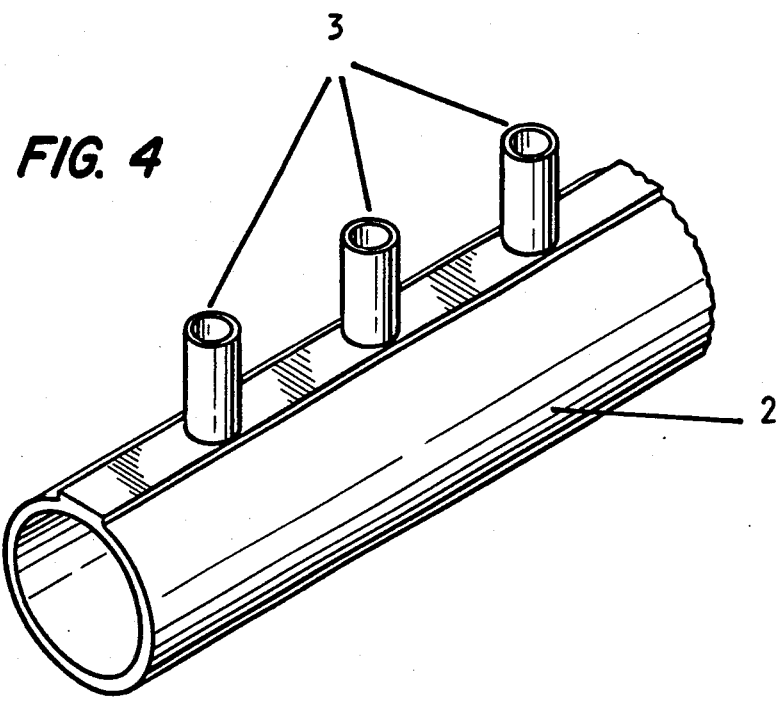
Figure 5:
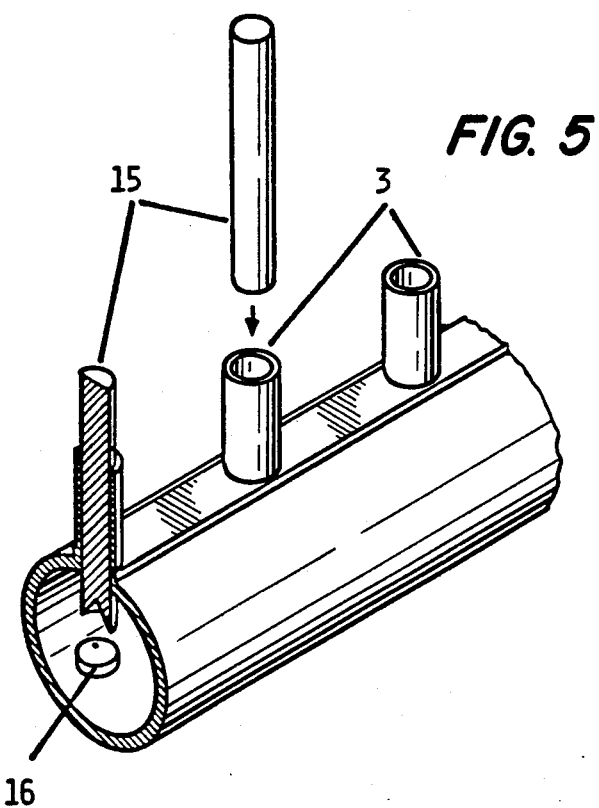

FIG. 4 shows a segment of the manifold tube (2) with three integral, individual hollow risers (3) prior to a final step in the manufacturing process illustrated schematically in FIG. 5.

In FIG. 5 a cutting or perforating tool (15) is applied in order to form apertures under the hollow risers (3) by removing parts (16) of the wall of the manifold tube (2). Free inlets are thus formed, ensuring distribution of medium from the manifold tube to all individual hollow risers.

Figure 6:
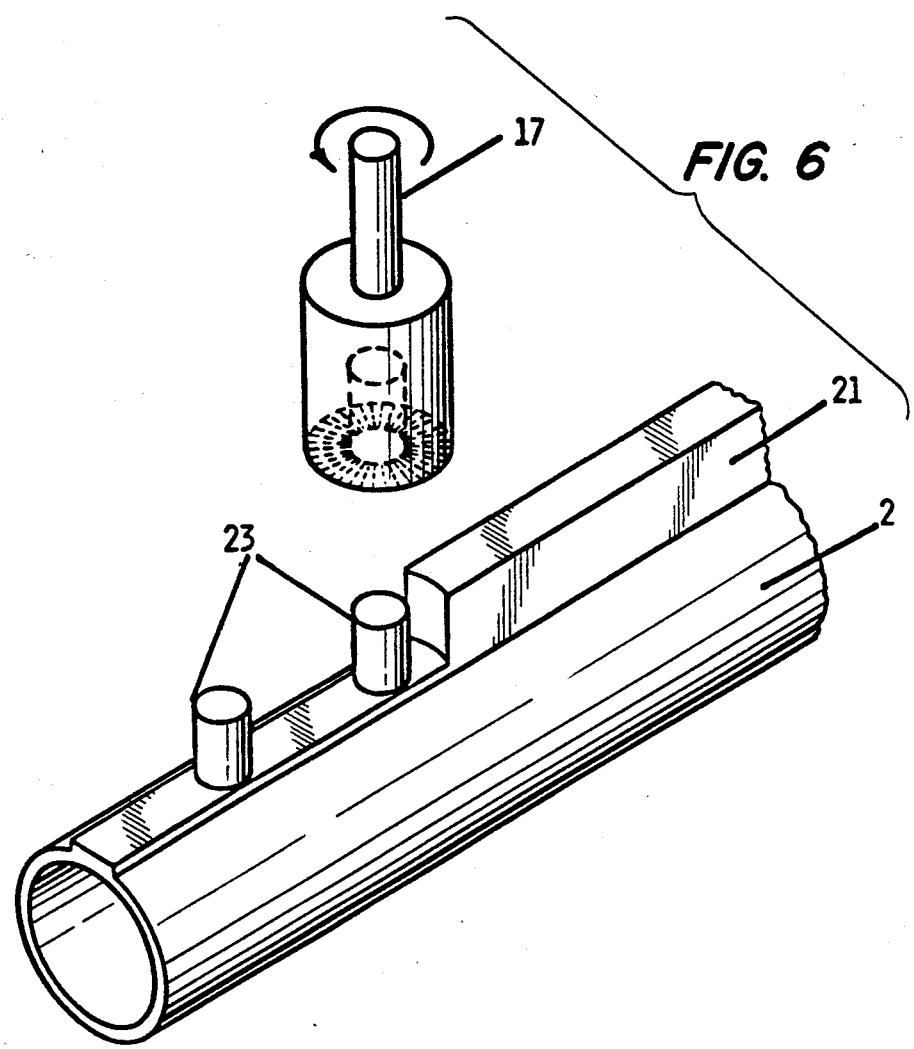

FIG. 6 illustrates an alternative step to the one shown in FIG. 2. Instead of applying an extrusion operation in order to provide individual solid risers (23) from the co-extruded, protruding neck part (21), a specially designed cutting tool (17) is used to remove excess material and form a plurality of discrete risers (23). This operation will of course give a slight increase in the use of material.

From the foregoing it will be apparent that various modifications of the presently illustrated and described manufacturing process and the achieved manifolds may be made by those skilled in the art without departing from the spirit of the invention as expressed in the accompanying claims. E.g. the hollow shapes (2) can also be provided as multicavity shapes, or the manifold as an intermediate product can be cut down to pieces providing smaller units, e.g. T-formed fittings.

I claim:

1. Method of manufacturing an integrated manifold, particularly for a heat exchanger, said manifold being formed from an extruded hollow shape, said method comprising the steps of:

providing a hollow metallic shape with one or more longitudinally running solid integrated protruding neck parts, forming from said protruding neck parts a plurality of individual risers having a substantially solid cross-section, reshaping said individual risers by means of a reverse impact extrusion process into hollow risers, and finally providing apertures in the wall of said hollow shape, said apertures being situated under the hollow risers and ensuring formation of inlets connecting the cavity of the hollow shape with the individual hollow risers.

2. Method as claimed in claim 1, where the formation of the individual risers from the solid integrated neck part is made by a cold forming process, where the height of the intermediate formed risers is higher than the original neck part.

3. Method as claimed in claim 1, where the formation of the individual risers from the solid integrated neck part is made by removal of excess bridging material between the required neck areas to form the individual risers.

* * * * *